United States Patent
Park et al.

(10) Patent No.: US 12,534,575 B2
(45) Date of Patent: Jan. 27, 2026

(54) OPTICAL POLYMER AND LENS INCLUDING SAME

(71) Applicants: SAMSUNG ELECTRO-MECHANICS CO., LTD., Suwon-si (KR); UNIVERSITY-INDUSTRY COOPERATION GROUP OF KYUNG HEE UNIVERSITY, Yongin-si (KR)

(72) Inventors: Seong Chan Park, Suwon-si (KR); Choon Keun Lee, Suwon-si (KR); Jee Woo Lim, Yongin-si (KR); Ji Sung Choi, Yongin-si (KR); Yu Jin Jeon, Yongin-si (KR)

(73) Assignees: SAMSUNG ELECTRO-MECHANICS CO., LTD., Suwon-si (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 841 days.

(21) Appl. No.: 17/711,104

(22) Filed: Apr. 1, 2022

(65) Prior Publication Data

US 2023/0123182 A1    Apr. 20, 2023

(30) Foreign Application Priority Data

Oct. 19, 2021  (KR) .................. 10-2021-0139582

(51) Int. Cl.
| | |
|---|---|
| *C08G 75/0227* | (2016.01) |
| *C08G 65/00* | (2006.01) |
| *C08G 75/02* | (2016.01) |
| *C08G 75/045* | (2016.01) |
| *G02B 1/04* | (2006.01) |

(52) U.S. Cl.
CPC ....... *C08G 75/0227* (2013.01); *C08G 65/002* (2013.01); *C08G 75/02* (2013.01); *C08G 75/045* (2013.01); *G02B 1/041* (2013.01)

(58) Field of Classification Search
None
See application file for complete search history.

(56) References Cited

U.S. PATENT DOCUMENTS

| | | |
|---|---|---|
| 2004/0019180 A1 | 1/2004 | Makioka et al. |
| 2010/0301271 A1 | 12/2010 | Adlem et al. |
| 2023/0123182 A1* | 4/2023 | Park .......... C08L 81/02 359/819 |

FOREIGN PATENT DOCUMENTS

| | | | |
|---|---|---|---|
| CN | 103204991 | * | 7/2013 |
| JP | 2008-69224 A | | 3/2008 |
| JP | 2013-185009 A | | 9/2013 |
| JP | 2016-164238 A | | 9/2016 |
| TW | 577901 B | | 3/2004 |

OTHER PUBLICATIONS

Oishi; Synthesis of Polymers by Using Fluorene IV; Journal of Polymer Science Polymer Chemistry vol. 22 (1984) pp. 2721-2728. (Year: 1984).*

Taiwanese Office Action issued on Oct. 25, 2022, in counterpart Taiwanese Patent Application No. 111112759 (5 pages in English, 4 pages in Chinese).

* cited by examiner

*Primary Examiner* — David J Buttner
(74) *Attorney, Agent, or Firm* — NSIP Law

(57) ABSTRACT

A lens includes an optical polymer represented by:

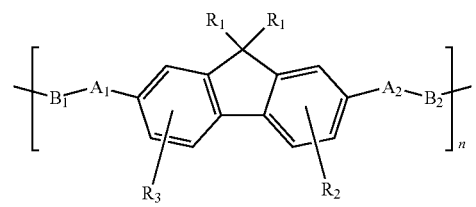

where $R_1$ to $R_3$ are each independently hydrogen, deuterium, halogen, or organic group comprising any one selected from substituted or unsubstituted C1-C60 alkyl group, substituted or unsubstituted C3-C60 cycloalkyl group, substituted or unsubstituted C1-C60 alkoxy group, substituted or unsubstituted C6-C60 aryl group, and substituted or unsubstituted C2-C60 heteroaryl group having at least one hetero atom selected from group consisting of N, O, and S, $A_1$ is a single bond, an oxygen atom, or a sulfur atom, $A_2$ is an oxygen atom or sulfur atom, $B_1$ and $B_2$ are each independently a single bond or an organic group represented by -al-D-al-, and n represents an integer of 5 or more and 500 or less, where al is a C1-C8 alkylene group, and D is $-S(=O)_2-X-$, $-X-S(=O)_2-$, $-S(=O)_2-X-S(=O)_2-$, $-C(=O)-X-$, $-X-C(=O)-$, $-C(=O)-X-C(=O)-$, carbonyl, alkenylene, alkynylene, ester, or ether, where X is a C6-C60 arylene group.

17 Claims, 2 Drawing Sheets

OPTICAL POLYMER AND LENS INCLUDING SAME

CROSS-REFERENCE TO RELATED APPLICATION(S)

This application claims benefit of priority to Korean Patent Application No. 10-2021-0139582 filed on Oct. 19, 2021 in the Korean Intellectual Property Office, the entire disclosure of which is incorporated herein by reference for all purposes.

BACKGROUND

1. Field

The present disclosure relates to an optical polymer and a lens including the same.

2. Description of Related Art

A transparent plastic material has been used as a substitute for glass.

Examples of transparent plastic materials used for lenses include polyester, polycarbonate, polymethyl methacrylate, and the like. When a component such as sulfur (S) or the like is used for the transparent plastic materials, a lens having a high refractive index may be formed. However, when sulfur (S) is used in excess, a difference between an in-plane refractive index and an out-of-plane refractive index may become large, and thereby, there may be a problem in which optical performance is deteriorated.

SUMMARY

In one general aspect, an optical polymer includes a repeating unit represented by the following Formula 1:

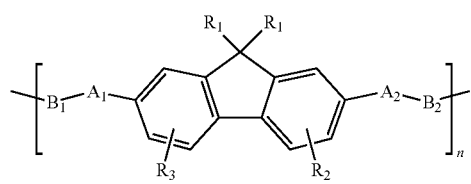

[Formula 1]

where $R_1$ to $R_3$ are each independently hydrogen, deuterium, halogen, or an organic group including any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group including at least one hetero atom selected from the group consisting of N, O, and S, where $A_1$ is a single bond, an oxygen atom, or a sulfur atom, $A_2$ is an oxygen atom or a sulfur atom, $B_1$ and $B_2$ are each independently a single bond or an organic group represented by the following Formula 2, and n represents an integer of 5 or more and 500 or less:

-al-D-al- [Formula 2]

where al is a C1-C8 alkylene group, and D is —S(=O)$_2$—X—, —X—S(=O)$_2$—, —S(=O)$_2$—X—S(=O)$_2$—, —C(=O)—X—, —X—C(=O)—, —C(=O)—X—C(=O)—, carbonyl, alkenylene, alkynylene, ester, or ether, wherein X is a C6-C60 arylene group.

$R_1$ may include the following Formula 3:

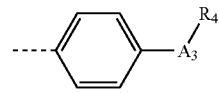

[Formula 3]

where $A_3$ is a single bond, an oxygen atom, or a sulfur atom, $R_4$ is hydrogen, deuterium, halogen, or an organic group including any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group including at least one hetero atom selected from the group consisting of N, O, and S, and x is an integer of 1 to 4.

$R_1$ may include the following Formula 4:

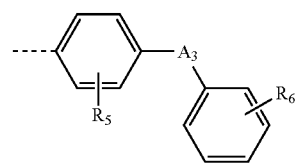

[Formula 4]

where $A_3$ is a single bond, an oxygen atom, or a sulfur atom, $R_5$ and $R_6$ are each independently hydrogen, deuterium, halogen, or an organic group including any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group including at least one hetero atom selected from the group consisting of N, O, and S, and x is an integer of 1 to 4.

$R_1$ may include the following Formula 5:

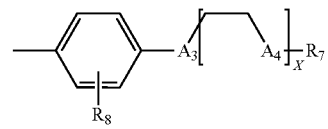

[Formula 5]

where $A_3$ is a single bond, an oxygen atom, or a sulfur atom, $A_4$ is an oxygen atom or a sulfur atom, and $R_7$ and $R_8$ are each independently hydrogen, deuterium, halogen, or an organic group including any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group including at least one hetero atom selected from the group consisting of N, O, and S, and x is an integer of 1 to 4.

$A_1$, $B_1$, and $B_2$ may be a single bond, and $A_2$ may be an oxygen atom or a sulfur atom.

A₁ and A₂ may each independently be an oxygen atom or a sulfur atom, and B₁ and B₂ may be single bonds, optical polymers.

A₁ and A₂ may be an oxygen atom or a sulfur atom, B₁ may be a single bond, B₂ may be an organic group of Formula 2, and D may be —S(=O)₂—X—, —X—S(=O)₂—, —S(=O)₂—X—S(=O)₂—, —C(=O)—X—, —X—C(=O)—, or —C(=O)—X—C(=O)—, wherein X may include the following Formula 6:

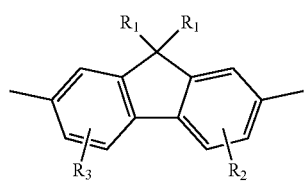

[Formula 6]

where R₁ to R₃ are each independently hydrogen, deuterium, halogen, or an organic group including any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group including at least one hetero atom selected from the group consisting of N, O, and S.

A₁ and A₂ may be an oxygen atom or a sulfur atom, B₁ may be a single bond, B₂ may be an organic group of Formula 2, and D may be —S(=O)₂—X—, —X—S(=O)₂—, —S(=O)₂—X—S(=O)₂—, —C(=O)—X—, —X—C(=O)—, or —C(=O)—X—C(=O)—, wherein X may include the following Formula 7:

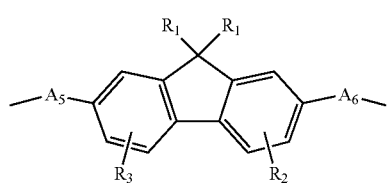

[Formula 7]

where R₁ to R₃ are each independently hydrogen, deuterium, halogen, or an organic group including any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group including at least one hetero atom selected from the group consisting of N, O, and S, and A₅ and A₆ are each independently a single bond, an oxygen atom, or a sulfur atom.

A₁ and A₂ may be an oxygen atom or a sulfur atom, B₁ may be a single bond, B₂ may be an organic group of Formula 2, and D may be —S(=O)₂—X—, —X—S(=O)₂—, —S(=O)₂—X—S(=O)₂—, —C(=O)—X—, —X—C(=O)—, or —C(=O)—X—C(=O)—, wherein X may include the following Formula 8:

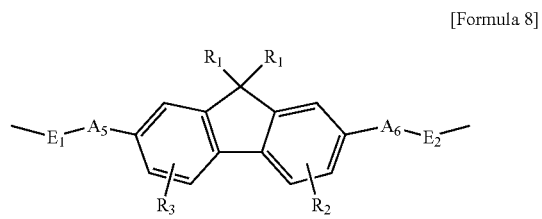

[Formula 8]

where R₁ to R₃ are each independently hydrogen, deuterium, halogen, or an organic group including any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group including at least one hetero atom selected from the group consisting of N, O, and S, A₅ and A₆ are each independently a single bond, an oxygen atom, or a sulfur atom, and E₁ and E₂ are each independently a substituent selected from carbonyl, alkenylene, alkynylene, ester, and ether.

A₁ and A₂ may be an oxygen atom or a sulfur atom, B₁ may be a single bond, B₂ may be an organic group of Formula 2, and D may be —S(=O)₂—X—, —X—S(=O)₂—, —S(=O)₂—X—S(=O)₂—, —C(=O)—X—, —X—C(=O)—, or —C(=O)—X—C(=O)—, wherein X may include the following Formula 9:

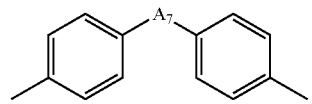

[Formula 9]

where A₇ is a single bond, an oxygen atom, or a sulfur atom.

A₁ and A₂ may be an oxygen atom or a sulfur atom, B₁ may be a single bond, B₂ may be an organic group of Formula 2, and D may be —S(=O)₂—X—, —X—S(=O)₂—, —S(=O)₂—X—S(=O)₂—, —C(=O)—X—, —X—C(=O)—, or —C(=O)—X—C(=O)—, wherein X may include the following Formula 10:

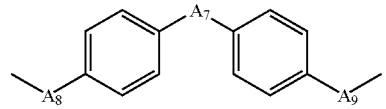

[Formula 10]

where A₇ to A₉ are each independently a single bond, an oxygen atom, or a sulfur atom.

A₁ and A₂ may be an oxygen atom or a sulfur atom, B₁ may be a single bond, B₂ may be an organic group of Formula 2, and D may be —S(=O)₂—X—, —X—S(=O)₂—, —S(=O)₂—X—S(=O)₂—, —C(=O)—X—, —X—C(=O)—, or —C(=O)—X—C(=O)—, wherein X may include the following Formula 11:

[Formula 11]

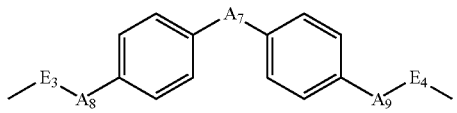

where $A_7$ to $A_9$ are each independently a single bond, an oxygen atom, or a sulfur atom, and $E_3$ and $E_4$ are each independently a substituent selected from carbonyl, alkenylene, alkynylene, ester, and ether.

The optical polymer may have a glass transition temperature (Tg) of 100° C. to 250° C.

The optical polymer may have a number average molecular weight of $1.0 \times 10^3$ to $1.0 \times 10^5$.

The optical polymer may have a refractive index of 1.50 or more and 1.80 or less, or 1.60 or more and 1.70 or less, measured at a wavelength of 587 nm.

In one general aspect, various embodiments include a lens that includes a polymer according to any embodiment described herein.

The lens may have an average transmittance of 80% or more, measured at a wavelength of 400 nm to 700 nm.

In one general aspect, various embodiments include a lens assembly including a lens barrel having an internal space, and one or more of the lens disposed in the internal space of the lens barrel along an optical axis.

Other features and aspects will be apparent from the following detailed description, the drawings, and the claims.

Figure 1:
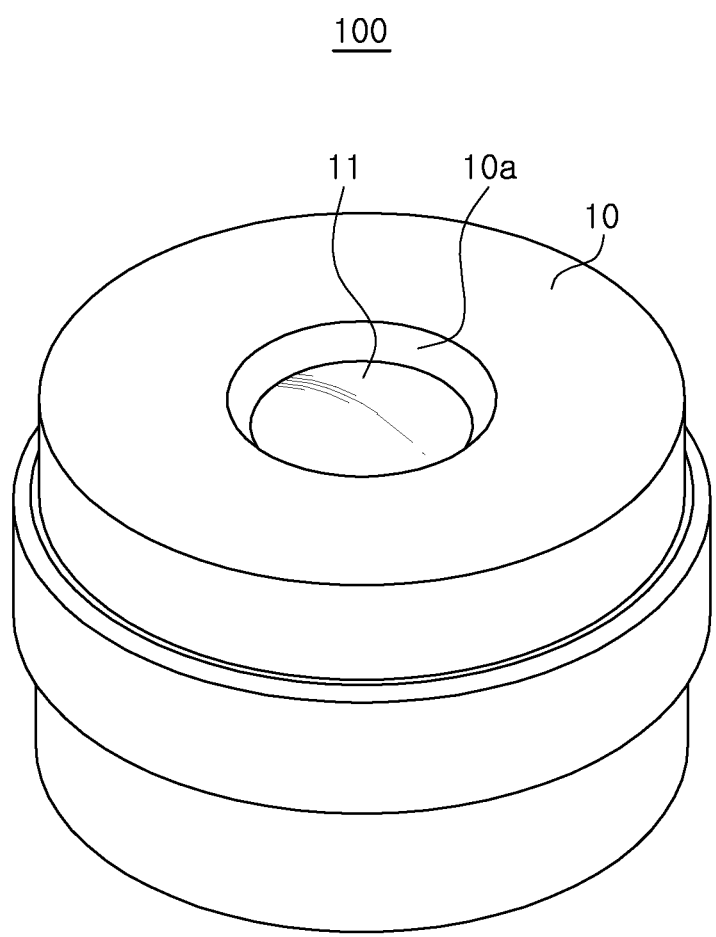
FIG. 1 is a perspective view schematically illustrating a lens assembly, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the processes, methods, materials, compounds, products, apparatuses, and/or systems described herein. However, various changes, modifications, and equivalents of the processes, methods, materials, compounds, products, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the processes, methods, materials, compounds, products, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As non-limiting examples, such terms as "comprises," "includes," and "has" specify the presence of stated features, numbers, operations, members, elements, and/or combinations thereof, but do not preclude the presence or addition of one or more other features, numbers, operations, members, elements, and/or combinations thereof. Additionally, herein, the use of the term "may" herein with respect to an example or embodiment (e.g., as to what an example or embodiment may include or implement) means that at least one example or embodiment exists where such a feature is included or implemented, while all examples are not limited thereto. As non-limiting examples, expressions such as "may have," "may include," or the like indicate the presence of a feature (e.g., a numerical value, a function, an operation, or a component such as a part or the like), corresponding thereto in one or more embodiments, and do not exclude the presence of additional features, all embodiments are not limited thereto.

Herein, expressions such as "A and/or B," "at least one of A or B," or "one or more of A and B" may include all possible combinations of items listed together. For example, "A and/or B," "at least one of A or B," or "one or more of A and B" may refer to (i) including at least one A; (ii) including at least one B, or (iii) including both at least one A and at least one B.

In the drawings, as non-limiting examples, an X direction may be defined as a first direction, an L direction, or a length direction, a Y direction may be defined as a second direction, a W direction, or a width direction, and a Z direction may be defined as a third direction, a T direction, a thickness direction, or an optical axis direction.

In an example, an optical polymer having excellent transparency and moldability may be used as a substitute for glass in lens, lens system, lens assembly examples, and example embodiments include such lens, lens systems, lens assemblies, as well as devices and electronic devices that include the same. For example, an example may provide a thin and light lens using an optical polymer having high refractive index, and examples may include various devices or products, e.g., miniaturized electronic devices or products, including such lens(es).

In one or more embodiments, an optical polymer may include a repeating unit represented by the following Formula 1:

[Formula 1]

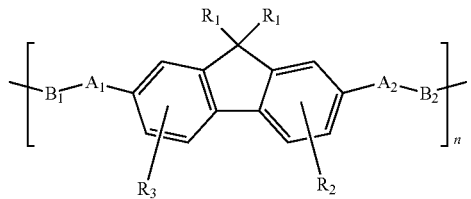

In Formula 1, $R_1$ to $R_3$ are each independently hydrogen, deuterium, halogen, or an organic group including any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group including at least one hetero atom selected from the group consisting of N, O, and S, $A_1$ is a single bond, an oxygen atom, or a sulfur atom, $A_2$ is an oxygen atom or a sulfur atom, $B_1$ and $B_2$ are each independently a single bond or an organic group represented by the following Formula 2, and n represents an integer of 5 or more and 500 or less:

-al-D-al- [Formula 2]

In Formula 2, al is a C1-C8 alkylene group, and D is —S(=O)$_2$—X—, —X—S(=O)$_2$—, —S(=O)$_2$—X—S(=O)$_2$—, —C(=O)—X—, —X—C(=O)—, —C(=O)—X—C(=O)—, carbonyl, alkenylene, alkynylene, ester, or ether, wherein X is a C6-C60 arylene group.

As used herein, the term "alkyl group" may mean a monovalent functional group derived from an alkane, and may mean a straight and/or branched alkyl group. The number of carbon atoms of the alkyl group may be, for example, 1 to 60, but is not limited thereto.

As used herein, the term "cycloalkyl group" may mean a functional group having a ring structure among monovalent functional groups derived from alkane. The number of carbon atoms of the cycloalkyl group may be, for example, 1 to 60, but is not limited thereto.

As used herein, the term "alkoxy group" may mean an alkyl group bonded to at least one oxygen atom, and may include a straight alkoxy group, a branched alkoxy group, and a cyclic alkoxy group. The number of carbon atoms of the alkoxy group may be, for example, 1 to 60, but is not limited thereto.

As used herein, the term "aryl group" may mean a monovalent functional group derived from an arene, and may mean a functional group including one or more benzene rings derived from an aromatic compound. The aryl group may be a monocyclic aryl group or a polycyclic aryl group, and the number of carbon atoms of the aryl group may be, for example, 6 to 60, but is not limited thereto.

As used herein, the term "heteroaryl group" may mean a monovalent functional group including at least one hetero atom as a ring constituent atom, and at least one of the benzene rings of the aryl group may be substituted with an atom other than carbon. The heteroaryl group may be monocyclic or polycyclic, and the number of carbon atoms of the heteroaryl group may be, for example, 6 to 60, but is not limited thereto.

In general, materials including a benzene ring having a pi electron may have a high refractive index.

As illustrated below, a diarylfluorene structure may form a cardo structure, and two upper benzene rings and two lower benzene rings may intersect vertically with respect to carbon 9:

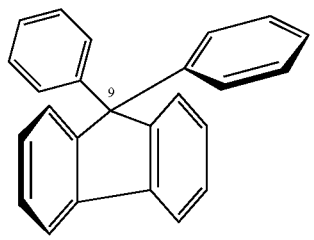

Arylfluorene having a cardo structure

An optical polymer including such a structure is characterized by having a small difference between an in-plane refractive index and an out-of-plane refractive index, thereby reducing birefringence.

An optical polymer, according to one or more embodiments, may include a compound of Formula 1 described above and have a high refractive index while suppressing birefringence, for example.

The compound of Formula 1 may include fluorene as a main chain.

The following Formula i represents fluorine:

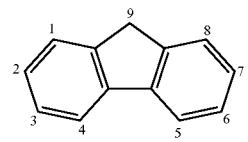

[Formula i]

Thus, referring to Formulas i and 1, an optical polymer according to one or more embodiments may have a fluorene structure, and the fluorene structure may be included in a main chain. The expression "the fluorene structure is included in a main chain" may refer to the fact that fluorene is included as one component of a straight chain constituting a repeating unit. For example, an optical polymer according to one or more embodiments may be connected to a main chain of a repeating unit constituting a polymer, through $2^{nd}$ and $7^{th}$ positions in Formula i above.

Typical optical polymers have a structure in which a main chain of a polymer and fluorene are connected through $9^{th}$ position of Formula i above. This structure may have a problem in that a functional group is difficult to be introduced to fluorene.

Further descriptions of various embodiments will hereinafter be provided.

In one or more embodiments, an optical polymer, fluorene may become a main chain of a polymer through $2^{nd}$ and $7^{th}$ positions, to substitute various functional groups through $2^{nd}$ position, and to effectively control a glass transition temperature while realizing a high refractive index. Therefore, an optical polymer having excellent moldability may be provided in one or more embodiments.

In one or more various embodiments, $R_1$ of Formula 1 may include any one of Formulas 3 to 5 below:

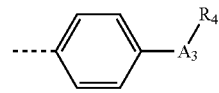

[Formula 3]

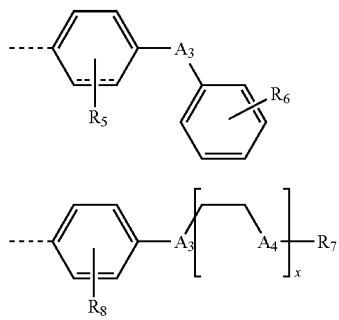

[Formula 4]

[Formula 5]

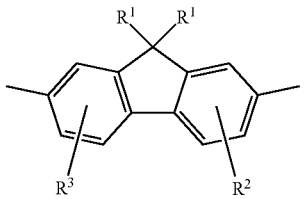

[Formula 6]

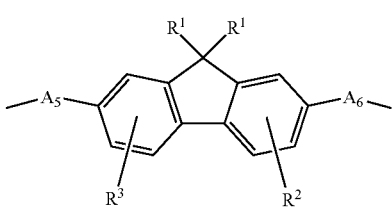

[Formula 7]

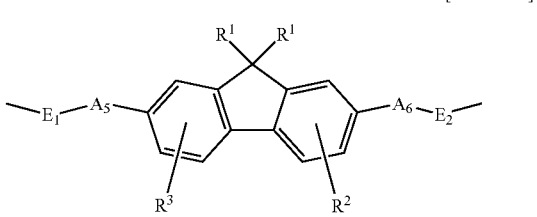

[Formula 8]

In Formulas 3 to 5, $A_3$ is a single bond, an oxygen atom, or a sulfur atom, $A_4$ is an oxygen atom or a sulfur atom, and $R_4$ to $R_7$ are each independently hydrogen, deuterium, halogen, or an organic group including any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group including at least one hetero atom selected from the group consisting of N, O, and S, and x is an integer of 1 to 4.

In an optical polymer according to such an embodiment, compounds of Formulas 3 to 5 may be disposed at an $R_1$ site of Formula 1, and various functional groups may be substituted at the $R_1$ site as described above, to implement various properties depending on the purpose of use through various embodiment examples.

In an example, $A_1$, $B_1$, and $B_2$ of Formula 1 of an optical polymer may be a single bond, and $A_2$ may be an oxygen atom or a sulfur atom. The expression "$A_1$ and $B_1$ are a single bond" may refer to the fact that a separate atom is not disposed at $A_1$ and $B_1$ sites and is directly bonded to an external component outside the repeating unit, through $7^{th}$ position of fluorene.

In another example, $A_1$ and $A_2$ of Formula 1 of an optical polymer may each independently represent an oxygen atom or a sulfur atom, and $B_1$ and $B_2$ may be a single bond. In this case, an oxygen atom or a sulfur atom may be respectively disposed at $A_1$ and $A_2$ sites of Formula 1, and the oxygen atom or the sulfur atom may be bonded to an external component outside the repeating unit of the polymer.

In one or more various embodiments, $A_1$ and $A_2$ of Formula 1 of an optical polymer may be an oxygen atom or a sulfur atom, $B_1$ may be a single bond, and $B_2$ may be an organic group of Formula 2. In the optical polymer of such an embodiment, an oxygen atom or a sulfur atom disposed at the $A_1$ site may be bonded to an external component outside the repeating unit, and an oxygen atom or a sulfur atom disposed at the $A_2$ site may be bonded to a component of Formula 2. D of Formula 2 may be —S(=O)$_2$—X—, —X—S(=O)$_2$—, —S(=O)$_2$—X—S(=O)$_2$—, —C(=O)—X—, —X—C(=O)—, or —C(=O)—X—C(=O)—. The optical polymer according to such an embodiment may include a plurality of oxygen atoms or a plurality of sulfur atoms in the main chain of the repeating unit, to implement an optical polymer having a high refractive index.

In this case, for example, X in Formula 2 may be any one of Formulas 6 to 8 below:

In Formulas 6 to 8, $R_1$ is each independently hydrogen, deuterium, halogen, or an organic group including any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group including at least one hetero atom selected from the group consisting of N, O, and S, $A_5$ and $A_6$ are each independently a single bond, an oxygen atom, or a sulfur atom, and $E_1$ and $E_2$ are each independently a substituent selected from carbonyl, alkenylene, alkynylene, ester, and ether.

The optical polymer according to such an embodiment may further include a fluorene skeleton structure connected to the structure of Formula 1, described above, including Formulas 6 to 8, thereby further suppressing birefringence of the optical polymer, and implementing a polymer having excellent optical properties, in one or more embodiments.

In one or more various embodiments, $A_1$ and $A_2$ of Formula 1 of an optical polymer may be an oxygen atom or a sulfur atom, $B_1$ may be a single bond, $B_2$ may be an organic group of Formula 2, and D may be —S(=O)$_2$—X—, —X—S(=O)$_2$—, —S(=O)$_2$—X—S(=O)$_2$—, —C(=O)—X—, —X—C(=O)—, or —C(=O)—X—C(=O)—, and X may be any one of Formulas 9 to 11 below:

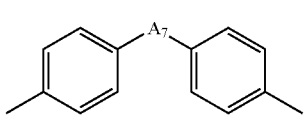

[Formula 9]

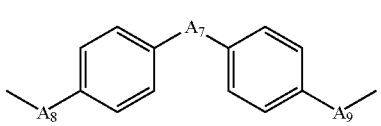

[Formula 10]

[Formula 11]

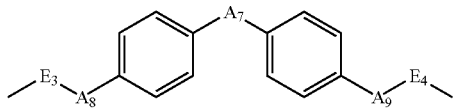

In Formulas 9 to 11, $A_7$ to $A_9$ are each independently a single bond, an oxygen atom, or a sulfur atom, and $E_3$ and $E_4$ are each independently a substituent selected from carbonyl, alkenylene, alkynylene, ester, and ether.

The optical polymer according to such an embodiment may include Formulas 9 to 11 having structures, different from structures of Formulas 6 to 8, described above, in the main chain. The structures of Formulas 9 to 11 may have a different structure from the fluorene structure, and may have a structure in which a benzene ring is bonded through an oxygen atom or a sulfur atom, for example. Therefore, an optical polymer according to one or more embodiments may have high transmittance even in a wide wavelength band.

In an example, a glass transition temperature (Tg, glass transition temperatures) of an optical polymer may be in the range of 100° C. to 250° C., according to one or more embodiments. The glass transition temperature may be 100° C. or more and 250° C. or less, but is not limited thereto. The glass transition temperature may be measured using a differential scanning calorimeter (DSC, METTLER TOLEDO, DSC 3+, manufactured by Mettler). When a glass transition temperature of an optical polymer satisfies the above range, for example, a lens having high hardness and excellent moldability may be manufactured using an optical polymer according to one or more embodiments.

In another example, an optical polymer may have a number average molecular weight (Mn) in the range of $1.0 \times 10^3$ to $1.0 \times 10^5$, according to one or more embodiments. The number average molecular weight may be $1.0 \times 10^3$ or more and $1.0 \times 10^5$ or less, but is not limited thereto. The number average molecular weight may be measured using gel permeation chromatography (GPC, Agilent mixed B column and alliance 2695 by Waters). When a number average molecular weight of an optical polymer according to one or more embodiments is outside of the above range, it may be difficult to separate from a mold during the manufacturing process thereof, to deteriorate moldability, and affect mechanical properties, such as weakening of mechanical strength or the like.

In another example, an optical polymer may have a refractive index of 1.50 or more and 1.80 or less, measured at a wavelength of 587 nm, according to one or more embodiments. The refractive index may be, for example, 1.60 or more and 1.7 or less, but is not limited thereto. The refractive index may be measured using, for example, a prism-coupler (Model 2010/M, Metricon). Specifically, the refractive index may be a value measured for a sample having a thickness of 150 to 200 µm at room temperature (25° C.), but is not limited thereto. An optical polymer according to one or more embodiments may include a fluorene structure within a main chain backbone of a repeating unit, as described above, to form a lens having a high refractive index while having excellent transmittance.

Various embodiments also include a lens and lens system. For example, the lens may include the above-described optical polymer, according to one or more embodiments. The lens may, for example, be prepared by curing the above-described optical polymer, but is not limited thereto.

In an example, such a lens according to one or more embodiments may have an average transmittance of 80% at a wavelength of 400 nm to 700 nm. The average transmittance may be 70% or more or 80% or more, and an upper limit thereof may be 100% or less, but is not limited thereto. The average transmittance may be a value measured using a spectrophotometer (UV-2550, manufactured by Shimadzu Corporation) with respect to a film having a thickness of 1 µm made of an optical polymer, and, for example, may refer to an arithmetic mean of values measured by changing a wavelength of 400 nm to 700 nm by 2 nm. As described above, the lens according to such an embodiment may be made of an optical polymer including a fluorene structure in a main chain to have a high refractive index and excellent transmittance at the same time.

Various embodiments also include lens system(s) or lens assembl(ies). As a non-limiting example, an example lens assembly will be described in greater detail with reference to FIGS. 1 and 2 below, according to one or more embodiments.

Figure 2:
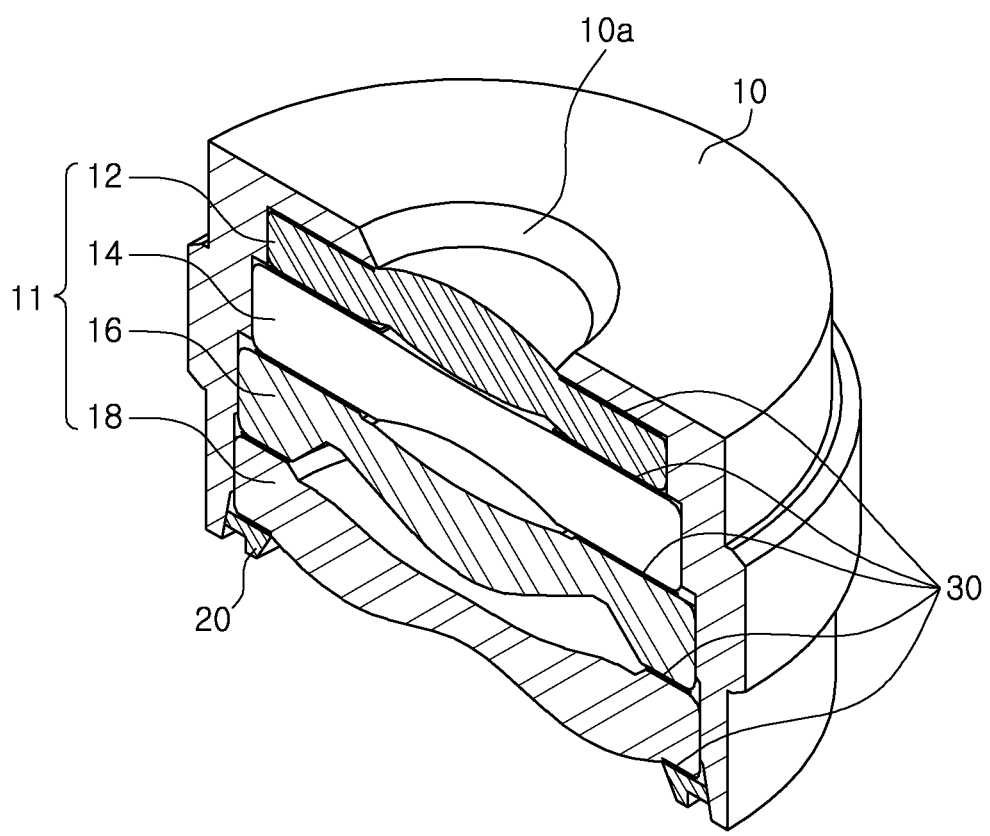
FIG. 2 is a cross-sectional view of FIG. 1, taken along line I-I', according to one or more embodiments.

Referring to FIGS. 1 and 2, a lens assembly 100 may include a lens barrel 10 including an internal space, at least one lens 11 disposed in the internal space along an optical axis, a blocking portion 30 provided on an outer surface of the lens, and a press-fit ring 20 for fixing the lens 11, according to one or more embodiments.

The lens barrel 10 may have the internal space of a certain size, in which one or more lenses 11 are arranged along the optical axis. For example, the lens barrel 10 may have a hollow cylindrical shape, and a lens hole 10a for transmitting light may be formed to pass through an upper surface of the lens barrel 10.

The number of lenses 11 provided in the lens barrel 10 may be at least one, and the lenses 11, for example, may include a plurality of lenses 12, 14, 16, and 18, as illustrated in the drawings, but is not limited thereto.

The press-fit ring 20 may be provided to prevent the lens 11 from being separated outside the lens barrel 10, and may be inserted into and coupled to an inner side of the lens barrel 10. The blocking portion 30 may be formed on a rib surface of the lens 11 accommodated in the lens barrel 10, to prevent a flare phenomenon degrading resolution.

Hereinafter, various embodiments will be described in greater detail through Preparation Examples and Examples. However, the spirit and scope of the present disclosure is not limited to such embodiments.

Preparation Example 1

4.06 g of 4-bromothioanisole and 0.486 g of magnesium were added to 40 mL of anhydrous tetrahydrofuran (anhydrous THF), and a mixture was heated to reflux at 75° C. for 24 hours. To this reacted product, 4.5 g of 2,7-dibromo-9-fluorenone and 10 mL of anhydrous tetrahydrofuran were added, heated to reflux at 80° C. for 8 hours, cooled to room temperature, and stirred for 2 hours. After a reaction was terminated with ammonium chloride, an organic layer extracted by dichloromethane was washed with an aqueous solution of water and saturated sodium chloride. Then, the extracted organic layer was dried, filtered, and concentrated under reduced pressure. A concentrate was separated by column chromatography on silica gel using hexane/ethyl acetate (volume ratio of 12/1), to obtain 3.393 g of an intermediate product, 2,7-dibromo-9-(4-methylthio)phenyl)-9-fluoren-9H-ol. $^1$H NMR (500 MHz, CDCl3) δ7.500 (d, 4H), 7.421 (d, 2H), 7.256-7.242 (m, 2H), 7.183-7.165 (m, 2H), 2.459 (s, 6H), 2.417 (s, 1H)

3.35 g of the prepared 2,7-dibromo-9-(4-methylthio)phenyl)-9-fluoren-9H-ol, 20 mL of thioanisole, and 1.3 mL of trifluoromethanesulfonic acid were placed in a 250 mL round bottom flask, and stirred at 50° C. After cooling to room temperature, a reaction was terminated with sodium hydrogen carbonate. An organic layer extracted by dichloromethane was concentrated under reduced pressure, and precipitated in methanol. A precipitate obtained after centrifugation was vacuum dried to obtain 3.008 g of a 2,7-dibromodiarylfluorene monomer.

Then, using NMR, the 2,7-dibromodiarylfluorene monomer was confirmed. $^1$H NMR (500 MHz, CDCL3) δ7.646-7.630 (d, 2H), 7.520 (d, 2H), 7.465 (dd, 2H), 7.05-7.13 (m, 8H), 2.439 (s, 6H)

Preparation Example 2

2.12 g of 2,7-dihydroxy-9-fluorenone, 2.5 mL of allyl bromide, and 6.21 g of potassium carbonate were added to 20 mL of anhydrous dimethylformamide (DMF), and a mixture was stirred at room temperature for 24 hours. After a reaction was terminated by ammonium chloride, an organic layer extracted by ethyl acetate was washed with an aqueous solution of water and saturated sodium chloride. Then, the extracted organic layer was dried, filtered, and concentrated under reduced pressure to obtain 2.27 g of 2,7-bis(allyloxy)-9-fluorenone. $^1$H NMR (500 MHz, CD$_2$Cl$_2$) δ7.560 (m, 2H), 7.111 (m, 4H), 6.045 (m, 2H), 5.425 (dd, 2H), 5.287 (dd, 2H), 4.643 (dd, 4H)

3.25 g of 4-bromothioanisole and 0.389 g of magnesium were added to 16 mL of anhydrous tetrahydrofuran, and a mixture thereof was heated and refluxed at 75° C. for 24 hours. To this reacted product, 1.9 g of 2,7-bis(Allyloxy)-9-fluorenone and 8 mL of anhydrous tetrahydrofuran were added and stirred at room temperature for 24 hours. After a reaction was terminated by ammonium chloride, an organic layer extracted by ethyl acetate was washed with an aqueous solution of water and saturated sodium chloride. Then, the extracted organic layer was dried, filtered, and concentrated under reduced pressure. A concentrate was separated by column chromatography on silica gel using hexane/ethyl acetate (volume ratio of 9/1), to obtain 3.605 g of an intermediate product, 2,7-bis(allyloxy)-9-(4-(methylthio)phenyl)-9H-fluoren-9-ol. $^1$H NMR (500 MHz, CDCl$_3$) δ7.444 (d, 2H), 7.277 (m, 2H), 7.166 (m, 2H), 6.889-6.845 (m, 4H), 6.000 (m, 2H), 5.353 (dd, 2H), 5.266 (dd, 2H), 4.482 (dd, 4H), 2.446 (s, 4H)

3.605 g of the prepared 2,7-bis(allyloxy)-9-(4-(methylthio)phenyl)-9H-fluoren-9-ol, 3.74 mL of thioanisole, and 1.32 mL of trifluoroacetic acid were placed in a 250 mL round bottom flask, and stirred at 50° C. After cooling to room temperature, an organic layer extracted by ethyl acetate was washed with an aqueous solution of water and saturated sodium chloride. Then, the extracted organic layer was dried, filtered, and concentrated under reduced pressure. A concentrate was separated by column chromatography on silica gel using hexane/dichloromethane (volume ratio of 2/1) to 1.93 g of a 2,7-bisallyloxy-9,9-bis(4-methylthiophenyl)fluorene monomer.

Then, using NMR, the 2,7-bisallyloxy-9,9-bis(4-methylthiophenyl)fluorene monomer was confirmed. $^1$H NMR (400 MHz, CD$_2$Cl$_2$) δ7.572 (d, 2H), 7.101 (m, 8H), 6.908-6.868 (m, 4H), 6.013 (m, 2H), 5.392 (dd, 2H), 5.257 (dd, 2H), 4.493 (d, 4H), 2.434 (s, 6H)

Preparation Example 3

1.273 g of 2,7-hydroxy-9-fluorenone, 2.26 g of tert-butyldimethylsilyl chloride, 1.2254 g of imidazole were added to 18 mL of anhydrous dimethyl formamide, and a mixture was stirred at room temperature for 24 hours. An organic layer extracted by ethyl acetate was washed with an aqueous solution of water and saturated sodium chloride. Then, the extracted organic layer was dried, filtered, and concentrated under reduced pressure to obtain 2.27 g of 2,7-bis(tert-butyldimethylsilyl)-9-fluorenone. $^1$H NMR (500 MHz, CDCl$_3$) δ7.259 (m, 1H), 7.236 (m, 1H), 7.069 (m, 2H), 6.881 (m, 2H), 0.988 (s, 18H), 0.212 (s, 12H)

2.03 g of 4-bromothioanisole and 0.243 g of magnesium were added to 10 mL of anhydrous tetrahydrofuran (THF), and a mixture was heated to reflux at 75° C. for 24 hours. To this reacted product, 2.27 g of 2,7-bis(tert-butyldimethylsilyl)-9-fluorenone and 10 mL of anhydrous tetrahydrofuran (THF) were added, and stirred at room temperature for 24 hours. After a reaction was terminated by ammonium chloride, an organic layer extracted by ethyl acetate was washed with an aqueous solution of water and saturated sodium chloride. Then, the extracted organic layer was dried, filtered, and concentrated under reduced pressure, to obtain an intermediate product, 2,7-bis(tert-butyldimethylsilyl)-9-(4-(methylthio)phenyl)-9H-fluoren-9-ol. $^1$H NMR (400 MHz, CDCl$_3$) δ7.392 (m, 2H), 7.268 (m, 2H), 7.165 (m, 2H), 6.760 (m, 4H), 2.451 (s, 3H), 2.402 (s, 1H), 0.944 (s, 18H), 0.150 (s, 12H)

The prepared 2,7-bis(tert-butyldimethylsilyl)-9-(4-(methylthio)phenyl)-9H-fluoren-9-ol, 3.47 mL of thioanisole, and 0.84 mL of trifluoroacetic acid were placed in a 250 mL round bottom flask, and stirred at 50° C. After cooling to room temperature, an organic layer extracted by ethyl acetate was washed with an aqueous solution of water and saturated sodium chloride. Then, the extracted organic layer was dried, filtered, and concentrated under reduced pressure. A concentrate was separated by column chromatography on silica gel using hexane/ethyl acetate (volume ratio of 9/1) to obtain 1.59 g of 9,9-bis(4-(methylthio)phenyl)-9H-fluorene-2,7-diol. $^1$H NMR (400 MHz, DMSO) δ9.366 (s, 2H), 7.533 (m, 2H), 7.164 (m, 4H), 7.013 (m, 4H), 6.733-6.673 (m, 4H), 2.422 (s, 6H).

1.59 g of 9,9-bis(4-(methylthio)phenyl)-9H-fluorene-2,7-diol, 0.96 mL of acrylyl chloride, and 2.25 mL of triethylamine were added to 5 mL of dichloromethane, and a mixture was stirred at room temperature for 24 hours. After a reaction was terminated by ammonium chloride, an organic layer extracted by dichloromethane was washed with an aqueous solution of water and saturated sodium chloride. Then, the extracted organic layer was dried, filtered, and concentrated under reduced pressure. A concentrate was separated by column chromatography on silica gel using hexane/ethyl acetate (volume ratio of 4/1) to obtain 0.927 g of 2,7-bisacryloyloxy-9,9-bis(4-methylthiophenyl)fluorene.

Then, using NMR, the 2,7-bisacryloyloxy-9,9-bis(4-methylthiophenyl)fluorene monomer was confirmed.

$^1$H NMR (400 MHz, DMSO) δ8.002 (d, 2H), 7.258-7.040 (m, 12H), 6.501 (dd, 2H), 6.389 (dd, 2H), 6.151 (dd, 2H), 2.422 (s, 6H).

Preparation Example 4

In a 100 ml round bottom flask, 1.802 g of 9-fluorenone, 2.79 g of iodine (1-2), and 0.57 g of periodic acid were placed, 2 ml of distilled water, 9 ml of acetic acid, and 0.6 ml of sulfuric acid ml were added, and stirred at room temperature for 30 minutes. Subsequently, a mixture was further stirred at 45° C. for 1 hour and at 50° C. for 4 hours. 9 ml of acetic acid was further added, heated to 60° C., and stirred overnight. After cooling to room temperature, a cooled mixture was stirred for 48 hours, and a precipitate was filtered. A filtered precipitate was dissolved in toluene, and separated by column chromatography on silica gel using hexane/toluene (volume ratio of 3/2), to obtain 1.824 g of 2,7-diiodo-9-fluorenone. $^1$H NMR (400 MHz, CDCl$_3$) δ7.966 (m, 2H), 7.855 (m, 2H), 7.293 (m, 2H)

1.22 g of 4-bromothioanisole and 0.146 g of magnesium were added to 12 mL of anhydrous tetrahydrofuran, and a mixture was heated, and refluxed at 75° C. for 24 hours. To this reacted product, 1.784 g of 2,7-diiodo-9-fluorenone and 3 mL of anhydrous tetrahydrofuran were added, and stirred at 70° C. overnight. After a reaction was terminated by ammonium chloride, an organic layer extracted by ethyl acetate was washed an aqueous solution of water and saturated sodium chloride. Then, the extracted organic layer was dried, filtered, and concentrated under reduced pressure. A concentrate was separated by column chromatography on silica gel using hexane/ethyl acetate (volume ratio of 9/1), to obtain 2.125 g of 2,7-diiodo-9-(4-(methylthio)phenyl)-9H-fluoren-9-ol. $^1$H NMR (400 MHz, CDCl$_3$) δ7.694 (m, 2H), 7.615 (m, 2H), 7.399 (m, 2H), 7.238 (m, 2H), 7.189 (m, 2H), 2.467 (s, 3H), 2.422 (s, 1H)

2.125 g of the prepared 2,7-diiodo-9-(4-(methylthio)phenyl)-9H-fluoren-9-ol, 10 mL of thioanisole, and 0.67 mL of triflic acid were placed in a 500 mL round bottom flask, and stirred at 50° C. for 2 hours. After cooling to room temperature, a solution was neutralized by sodium hydrogen carbonate, and an organic layer extracted by dichloromethane (DCM) was washed with an aqueous solution of water and saturated sodium chloride. Then, the extracted organic layer was dried, filtered, and concentrated under reduced pressure. A concentrate was separated by column chromatography on silica gel using hexane/ethyl acetate (volume ratio of 19/1), to obtain 1.84 g of 2,7-diiodo-9,9-bis(4-methylthiophenyl)fluorene. Then, using NMR, 2,7-diiodo-9,9-bis(4-methylthiophenyl)fluorene was confirmed. $^1$H NMR (500 MHz, CDCl3) δ7.746-7.630 (m, 4H), 7.477 (d, 2H), 7.049-7.13 (m, 8H), 2.453 (s, 6H)

0.331 g of the prepared 2,7-diiodo-9,9-bis(4-methylthiophenyl)fluorene, 0.720 g of sodium sulfide nonhydrate (Na$_2$S*?*9H$_2$O), and 6.35 mg of copper (Cu) were placed in a 20 ml vial, vacuum-argon backfill was performed three times, 4 ml of anhydrous dimethyl sulfoxide was added, and 0.01 ml of 1,2-ethanedithiol was added, and stirred for 20 hours at 100° C. After cooling to room temperature, an organic layer extracted by ethyl acetate was washed with an aqueous solution of ammonium chloride and an aqueous solution of saturated sodium chloride. Then, the extracted organic layer was dried and filtered, dissolved in dichloromethane, precipitated in hexane. The precipitate was vacuum dried to obtain 0.106 g of 2,7-dithiol-9,9-bis(4-methylthiophenyl)fluorine. Then, using NMR, 2,7-dithiol-9,9-bis(4-methylthiophenyl)fluorine was confirmed. $^1$H NMR (500 MHz, CDCl3) δ7.563 (d, 1H), 7.260 (m, 2H), 7.116-6.990 (m, 11H), 3.479 (s, 2H), 2.445 (s, 6H))

Example 1

1.3 g of the prepared 2,7-dibromo-9,9-bis(4-methylthiophenyl)fluorene and 1 mL of N-methylpyrrolidone were placed in a 5 mL vial, and stirred at 100° C. In another 5 mL vial, 179 mg of sodium sulfide and 1.2 mL of N-methylpyrrolidone were placed, stirred at 100° C., added to a solution in which a 2,7-dibromodiarylfluorene monomer was dissolved, and stirred for 72 hours at 170° C. After completion of a reaction, a mixture was precipitated in methanol, and a precipitate obtained after centrifugation was vacuum dried to obtain a polyphenylene sulfide derivative. $M_n$=4,000 g/mol, $^1$H NMR (500 MHz, CD$_2$Cl$_2$) δ7.644-7.019 (broad, 14H), 2.450-2.300 (broad, 6H))

Example 2

200 mg of the prepared 2,7-diiodo diarylfluorene monomer and 0.4 mL of 1-methyl-2-pyrrolidinone were placed in a 5 ml vial, and stirred at 100° C. To this reacted product, 0.12 mL of N,N-dicyclohexylmethylamine and 0.046 mL of 1,6-hexanedithiol were sequentially added, followed by stirring at 190° C. for 48 hours. After completion of a reaction, a mixture was precipitated in methanol, and a precipitate obtained after centrifugation was vacuum dried to obtain a polyphenylene sulfide derivative. $M_n$=3,000 g/mol, $^1$H NMR (400 MHz, CDCl$_3$) δ7.630-7.457 (broad, 4H), 7.162-7.000 (broad, 8H), 2.910-2.800 (broad, 2H), 2.565-2.335 (broad, 8H), 1.701-1.216 (broad, 8H))

Example 3

0.212 g of the prepared 2,7-bisacryloyloxy-9,9-bis(4-methylthiophenyl)fluorene and 55 mg of 1,4-benzenedithiol were placed in a 5 ml vial, 1 ml of dimethyl sulfoxide (DMSO) was added thereto, heat to 140° C. to dissolve a reacted product, and then 0.058 ml of dimethylcyclohexylamine was added and stirred for 20 hours at 140° C. After a reaction was completed, a mixture was precipitated in methanol, and a precipitate obtained after centrifugation was vacuum dried to obtain a polyphenylene sulfide derivative. ($M_n$=2,000 g/mol)

Example 4

0.142 g of the prepared 2,7-dithiol-9,9-bis(4-methylthiophenyl)fluorene and 4 mg of azobisisobutyronitrile (AIBN) were placed in a 5 ml vial, 0.3 ml of dimethylformamide (DMF) was added to dissolve a reacted product, and 1,4-butanedioldivinyl ether was added thereto at 85° C. After completion of a reaction, a mixture was precipitated in methanol, and a precipitate obtained after centrifugation was vacuum dried to obtain a polyphenylene sulfide derivative ($M_n$=3,000 g/mol).

Example 5

0.2 g of the prepared 2,7-bisallyloxy-9,9-bis(4-methylthiophenyl)fluorene and 1.88 mg of azobisisobutyronitrile (AIBN) were placed in a 5 ml vial, 1.2 ml of dimethylformamide (DMF) was added to dissolve a reacted product, 0.076 ml of bis(2-mercaptoethyl)sulfide was added and stirred at 85° C. for 48 hours. After completion of a reaction, a mixture was precipitated in methanol, and a precipitate obtained after centrifugation was vacuum dried to obtain a polyphenylene oxide derivative ($M_n$=3,000 g/mol).

Example 6

0.22 g of prepared 2,7-bisacryloyloxy-9,9-bis(4-methylthiophenyl)fluorene and 1.2 ml of tetrahydrofuran (THF) were placed in a 5 ml vial, 0.052 ml of bis(2-mercaptoethyl) sulfide and 0.056 ml of triethylamine (TEA) were added and stirred at room temperature for 20 hours. After completion of a reaction, a mixture was precipitated in methanol, and a precipitate obtained after centrifugation was vacuum dried to obtain a polyphenylene oxide derivative ($M_n$=11,000 g/mol, MWD=1.89, $T_g$=91.8° C.).

Test Results

[Optical Properties of Polyphenylene Sulfide Derivatives and Polyphenylene Oxide Derivatives, Including a Structure in which 9,9-Diarylfluorene is Linked at $2^{nd}$ and $7^{th}$ Positions]

After dissolving the polymers synthesized in the above example in tetrahydrofuran at a concentration of 10 mg/ml, a film was formed on a silicon wafer substrate by drop casting or spin casting (1500 rpm, 30 seconds), and cured in an oven at 60° C. for 1 hour.

Then, refractive indice $n_{TE}$ and $n_{TM}$ according to the polarization direction was measured at 632.8 nm using a prism coupler (JY Tech, SPA-4000), and an average refractive index ($n_{av}$=[(2nTE2+nTM2)/3]1/2) and birefringence ($\Delta n = n_{TE} - n_{TM}$) were calculated. In this case, $n_{TE}$ refers to an in-plane refractive index ($n_{TE}$), parallel to a molecular axis, and $n_{TM}$ refers to an out-of-plane ($n_{TM}$) refractive index, perpendicular to the molecular axis.

The following Table 1 shows the refractive indice $n_{TE}$ and $n_{TM}$, the average refractive index $n_{av}$, and the birefringence $\Delta n$, according to a polarization direction for each Example.

TABLE 1

| Example | $n_{TE}$ | $n_{TM}$ | $n_{av}$ | $\Delta n$ |
|---|---|---|---|---|
| 1 | 1.6802 | 1.6781 | 1.6795 | 0.0021 |
| 2 | 1.7099 | 1.7097 | 1.7098 | 0.0002 |
| 3 | 1.6891 | 1.6821 | 1.6868 | 0.0070 |
| 4 | 1.6255 | 1.6235 | 1.6245 | 0.0020 |
| 5 | 1.6624 | 1.6621 | 1.6623 | 0.0003 |
| 6 | 1.6569 | 1.6536 | 1.6557 | 0.0033 |

One of the various effects of one or more embodiments is to provide an optical polymer having a high refractive index, and a lens including the same.

One of various effects of one or more embodiments is to provide an optical polymer having high transmittance, and a lens including the same.

One of various effects of one or more embodiments is to provide an optical polymer having excellent moldability, and a lens including the same.

While various advantages and effects of various embodiments are not limited to the above, such advantages and effects, as well as other advantages and effects, may be more easily understood in the process of describing specific embodiments of the present disclosure.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components are combined in a different manner, and/or replaced or supplemented by other components or their equivalents. Therefore, in addition to the above disclosure, the scope of the disclosure may also be defined by the claims and their equivalents, and all variations within the scope of the claims and their equivalents are to be construed as being included in the disclosure.

What is claimed is:

1. A lens comprising an optical polymer, wherein the optical polymer comprises a repeating unit represented by the following Formula 1:

[Formula 1]

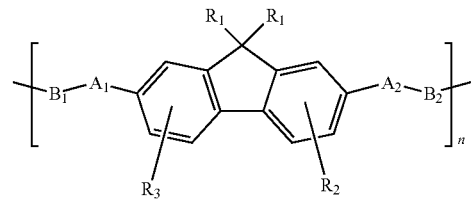

where $R_1$ to $R_3$ are each independently hydrogen, deuterium, halogen, or an organic group comprising any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group comprising at least one hetero atom selected from the group consisting of N, O, and S, where $A_1$ is a single bond, an oxygen atom, or a sulfur atom, $A_2$ is an oxygen atom or a sulfur atom, $B_1$ and $B_2$ are each independently a single bond or an organic group represented by the following Formula 2, and n represents an integer of 5 or more and 500 or less:

-al-D-al- [Formula 2]

where al is a C1-C8 alkylene group, and D is —S(=O)$_2$—X—, —X—S(=O)$_2$—, —S(=O)$_2$—X—S(=O)$_2$—, —C(=O)—X—, —X—C(=O)—, —C(=O)—X—C(=O)—, carbonyl, alkenylene, alkynylene, ester, or ether, wherein X is a C6-C60 arylene group.

2. The lens of claim 1, wherein $R_1$ comprises the following Formula 3:

[Formula 3]

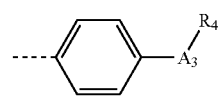

where $A_3$ is a single bond, an oxygen atom, or a sulfur atom, $R_4$ is hydrogen, deuterium, halogen, or an organic group comprising any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group comprising at least one hetero atom selected from the group consisting of N, O, and S, and x is an integer of 1 to 4.

3. The lens of claim 1, wherein $R_1$ comprises the following Formula 4:

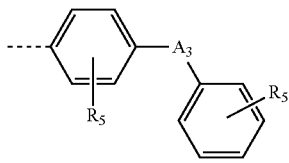

[Formula 4]

where $A_3$ is a single bond, an oxygen atom, or a sulfur atom, $R_5$ and $R_6$ are each independently hydrogen, deuterium, halogen, or an organic group comprising any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group comprising at least one hetero atom selected from the group consisting of N, O, and S, and x is an integer of 1 to 4.

4. The lens of claim 1, wherein $R_1$ comprises the following Formula 5:

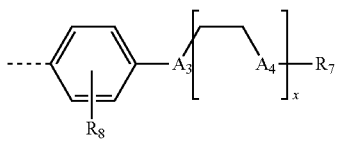

[Formula 5]

where $A_3$ is a single bond, an oxygen atom, or a sulfur atom, $A_4$ is an oxygen atom or a sulfur atom, and $R_7$ and $R_8$ are each independently hydrogen, deuterium, halogen, or an organic group comprising any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group comprising at least one hetero atom selected from the group consisting of N, O, and S, and x is an integer of 1 to 4.

5. The lens of claim 1, wherein $A_1$, $B_1$, and $B_2$ are a single bond, and $A_2$ is an oxygen atom or a sulfur atom.

6. The lens of claim 1, wherein $A_1$ and $A_2$ are each independently an oxygen atom or a sulfur atom, and $B_1$ and $B_2$ are single bonds, optical polymers.

7. The lens of claim 1, wherein $A_1$ and $A_2$ are an oxygen atom or a sulfur atom, $B_1$ is a single bond, $B_2$ is an organic group of Formula 2, and D is —S(=O)$_2$—X—, —X—S(=O)$_2$—, —S(=O)$_2$—X—S(=O)$_2$—, —C(=O)—X—, —X—C(=O)—, or —C(=O)—X—C(=O)—, wherein X comprises the following Formula 6:

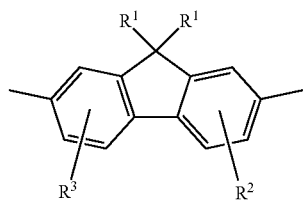

[Formula 6]

where $R_1$ to $R_3$ are each independently hydrogen, deuterium, halogen, or an organic group comprising any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group comprising at least one hetero atom selected from the group consisting of N, O, and S.

8. The lens of claim 1, wherein $A_1$ and $A_2$ are an oxygen atom or a sulfur atom, $B_1$ is a single bond, $B_2$ is an organic group of Formula 2, and D is —S(=O)$_2$—X—, —X—S(=O)$_2$—, —S(=O)$_2$—X—S(=O)$_2$—, —C(=O)—X—, —X—C(=O)—, or —C(=O)—X—C(=O)—, wherein X comprises the following Formula 7:

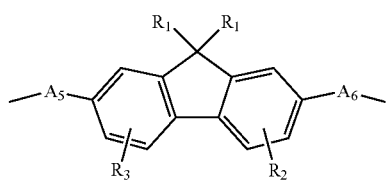

[Formula 7]

where $R_1$ to $R_3$ are each independently hydrogen, deuterium, halogen, or an organic group comprising any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group comprising at least one hetero atom selected from the group consisting of N, O, and S, and $A_5$ and $A_6$ are each independently a single bond, an oxygen atom, or a sulfur atom.

9. The lens of claim 1, wherein $A_1$ and $A_2$ are an oxygen atom or a sulfur atom, $B_1$ is a single bond, $B_2$ is an organic group of Formula 2, and D is —S(=O)$_2$—X—, —X—S(=O)$_2$—, —S(=O)$_2$—X—S(=O)$_2$—, —C(=O)—X—, —X—C(=O)—, or —C(=O)—X—C(=O)—, wherein X comprises the following Formula 8:

[Formula 8]

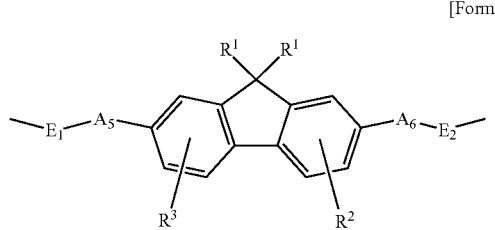

where $R_1$ to $R_3$ are each independently hydrogen, deuterium, halogen, or an organic group comprising any one selected from a substituted or unsubstituted C1-C60 alkyl group, a substituted or unsubstituted C3-C60 cycloalkyl group, a substituted or unsubstituted C1-C60 alkoxy group, a substituted or unsubstituted C6-C60 aryl group, and a substituted or unsubstituted C2-C60 heteroaryl group comprising at least one hetero atom selected from the group consisting of N, O, and S, $A_5$ and $A_6$ are each independently a single bond, an oxygen atom, or a sulfur atom, and $E_1$ and $E_2$ are each independently a substituent selected from carbonyl, alkenylene, alkynylene, ester, and ether.

10. The lens of claim 1, wherein $A_1$ and $A_2$ are an oxygen atom or a sulfur atom,
$B_1$ is a single bond,
$B_2$ is an organic group of Formula 2, and
D is —S(=O)$_2$—X—, —X—S(=O)$_2$—, —S(=O)$_2$—X—S(=O)$_2$—, —C(=O)—X—, —X—C(=O)—, or —C(=O)—X—C(=O)—,
wherein X comprises the following Formula 9:

[Formula 9]

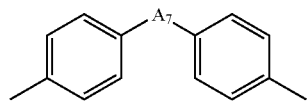

where $A_7$ is a single bond, an oxygen atom, or a sulfur atom.

11. The lens of claim 1, wherein $A_1$ and $A_2$ are an oxygen atom or a sulfur atom,
$B_1$ is a single bond,
$B_2$ is an organic group of Formula 2, and
D is —S(=O)$_2$—X—, —X—S(=O)$_2$—, —S(=O)$_2$—X—S(=O)$_2$—, —C(=O)—X—, —X—C(=O)—, or —C(=O)—X—C(=O)—,
wherein X comprises the following Formula 10:

[Formula 10]

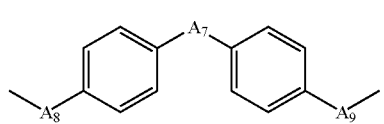

where $A_7$ to $A_9$ are each independently a single bond, an oxygen atom, or a sulfur atom.

12. The lens of claim 1, wherein $A_1$ and $A_2$ are an oxygen atom or a sulfur atom,
$B_1$ is a single bond,
$B_2$ is an organic group of Formula 2, and
D is —S(=O)$_2$—X—, —X—S(=O)$_2$—, —S(=O)$_2$—X—S(=O)$_2$—, —C(=O)—X—, —X—C(=O)—, or —C(=O)—X—C(=O)—,
wherein X comprises the following Formula 11:

[Formula 11]

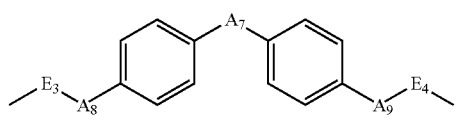

where $A_7$ to $A_9$ are each independently a single bond, an oxygen atom, or a sulfur atom, and $E_3$ and $E_4$ are each independently a substituent selected from carbonyl, alkenylene, alkynylene, ester, and ether.

13. The lens of claim 1, wherein the optical polymer has a glass transition temperature (Tg) of 100° C. to 250° C.

14. The lens of claim 1, wherein the optical polymer has a number average molecular weight of $1.0 \times 10^3$ to $1.0 \times 10^5$.

15. The lens of claim 1, wherein the optical polymer has a refractive index of 1.50 or more and 1.80 or less, or 1.60 or more and 1.70 or less, measured at a wavelength of 587 nm.

16. The lens of claim 1, having an average transmittance of 80% or more, measured at a wavelength of 400 nm to 700 nm.

17. A lens assembly comprising:
a lens barrel comprising an internal space; and
at least one lens of claim 1 disposed in the internal space of the lens barrel along an optical axis.

* * * * *